Figure 1:
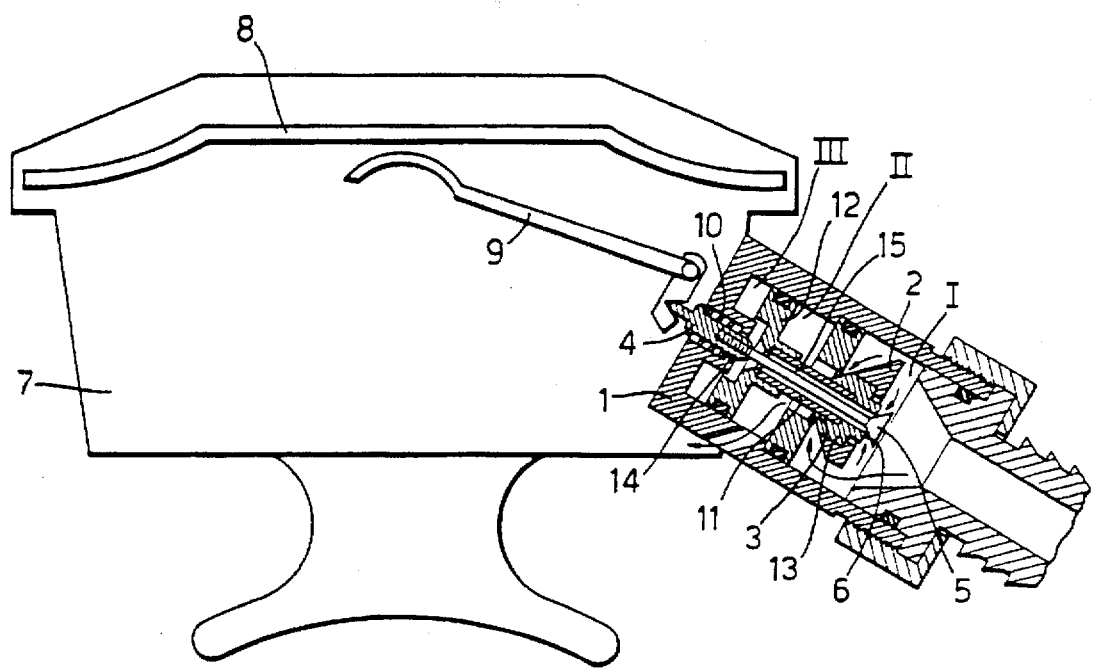

United States Patent
Ottestad

[11] Patent Number: 5,690,098
[45] Date of Patent: Nov. 25, 1997

[54] SERVO GAS REGULATING VALVE

[75] Inventor: Nils T. Ottestad, Tonsberg, Norway

[73] Assignee: Ottestad Breathing System A/S, Husoysund, Norway

[21] Appl. No.: 619,767
[22] PCT Filed: Oct. 4, 1994
[86] PCT No.: PCT/NO94/00160
   § 371 Date: May 9, 1996
   § 102(e) Date: May 9, 1996
[87] PCT Pub. No.: WO95/09674
   PCT Pub. Date: Apr. 13, 1995

[30] Foreign Application Priority Data

Oct. 5, 1993 [NO] Norway .................. 933551

[51] Int. Cl.$^6$ ............................ A62B 9/02
[52] U.S. Cl. ................. 128/205.24; 128/204.18
[58] Field of Search ................. 137/DIG. 908, 137/490; 128/205.24, 201.28, 203.11, 203.24, 204.26

[56] References Cited

U.S. PATENT DOCUMENTS

| | | | |
|---|---|---|---|
| 591,013 | 10/1897 | Schreidt | 137/490 |
| 873,324 | 12/1907 | Michaels | 137/490 |
| 2,925,824 | 2/1960 | Rockwell | 137/490 |
| 3,945,393 | 3/1976 | Teatini | 137/490 |
| 4,834,086 | 5/1989 | Garofalo | 128/205.24 |

Primary Examiner—V. Miller
Assistant Examiner—Robert N. Weiland
Attorney, Agent, or Firm—Kane,Dalsimer,Sullivan,Kurucz,Levy,Eisele and Richard, LLP

[57] ABSTRACT

A gas regulating valve, especially for use in breathing valves for diver masks and the like. The valve comprises a sleeve-shaped housing (1) having an inlet chamber (I) and an outlet chamber (II), a main valve body (2) cooperating with a seat (3) separating the inlet chamber (I) from the outlet chamber (II), a piston (12) or the like separating the outlet chamber (II) from a servo chamber (III), and a control valve (5,6) arranged to be opened and closed by the main valve body (2). The control valve (5,6) causes a controlled gas flow to the servo chamber (III), which entails that the main valve body (II) is forced to move such that the seat (6) of the control valve at all times rests sealingly against the valve body (5) of the control valve.

4 Claims, 1 Drawing Sheet

SERVO GAS REGULATING VALVE

The invention relates to a servo gas regulating valve comprising a housing having an inlet chamber and an outlet chamber, a main valve body cooperating with a seat separating the inlet chamber from the outlet chamber, a piston or the like separating the outlet chamber from a servo chamber, and a control valve arranged to be opened and closed by the main valve body.

Systems for supplying breathing gas are generally based on a regulated supply from reservoirs containing gas/air under pressure. In such systems the gas flow generally is controlled so that it is in accordance with the demand, i.e. it is the question of demand systems. In ordinary demand valves there is commonly a direct mechanical connection between a sensor diaphragm and the valve which opens or closes the nozzle opening. Similarly to the present invention, other demand valves are based on a servo principle. This implies that the pressure energy in a portion of the gas flow is utilized to amplify the force causing opening/closing of the nozzle. The pressure variations which have to be created on the sensor diaphragm to move the nozzle opening, thereby can be significantly reduced. Traditionally, servo valves have the weakness that they are constructed in a complicated manner and that they require frequent readjustments in order to operate satisfactorily. Further, servo valves often give an unstable gas regulation as a consequence of sealing means causing friction, or regulating mechanisms giving a time delay between the movement of the pilot valve and the main valve.

According to the invention there is provided a gas regulating valve of the introductorily stated type which, according to the invention, is characterized in that the control valve brings about a controlled gas flow to the servo chamber, which entails that the main valve body is forced to move such that the seat of the control valve at all times rests sealingly against the valve body of the control valve.

The valve according to the invention does not have stability problems as a consequence of friction in sealing means, and the regulating force is very small. Further, there is a minimum time delay between the control valve and the main valve, whereby a very precise control of large gas quantities is achieved. The invention, used both as a demand valve and as a pressure reduction valve, has been found to be very advantageous. It is simple to produce, it is not very sensitive to pressure variations, and it has a very good capacity.

Figure 2:
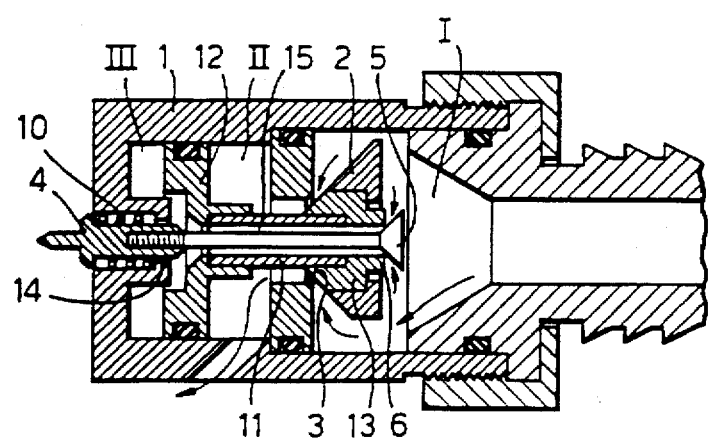

The invention will be further described below with reference to the drawings, wherein FIG. 1 shows a cross-section of an embodiment of a regulating valve according to the invention used on a demand valve, and FIG. 2 shows a somewhat enlarged sectional view of the regulating valve.

The illustrated demand valve consists of an outer casing 7 having a sensing diaphragm 8 which, through a lever 9 and an operating means 4, influences the gas regulating valve which is fixedly mounted to the casing 7.

The regulating valve comprises a housing 1 having an inlet chamber I and an outlet chamber II, a hollow main valve body 2 cooperating with a seat 3 separating the inlet chamber I from the outlet chamber II, a piston 12 separating the outlet chamber II from the servo chamber III of the valve, and a control valve comprising a valve body 5 and a seat 6, and which is arranged to be opened and closed by the main valve body 2. The seat 6 of the control valve is arranged in a channel 15 extending axially through the main valve body 2 and connecting the inlet chamber I with the servo chamber III, and the control valve body 5 is connected to the operating means 4 of the demand valve through said channel. The control valve regulates the gas flow between the inlet chamber and the servo chamber through the channel 15. When the valve body of the control valve is displaced, a gas flow is supplied to the servo chamber, and this causes a corresponding displacement of the main valve body.

As shown in the drawings, one side surface of the servo chamber III is constituted by one side surface of the piston 12 of which the other side surface faces the outlet chamber II and of which the central portion is rigidly connected to the main valve body 2. Instead of the piston 12 there could have been provided a diaphragm or the like.

In the illustrated embodiment, the main valve body 2 comprises a metal sleeve 11 which is pressed into a resilient sleeve 13 which constitutes the seat 6 of the control valve as well as the sealing surface between the main valve body 2 and the seat 3 of the main valve. The metal sleeve 11 is provided with barbes (not shown) and is pressed into the central part of the resilient sleeve 13.

When the user of the demand valve inhales, the pressure in the chamber below the sensing diaphragm 8 falls, whereby the lever 9 acts upon the operating means 4 and the valve body 5 of the control valve which opens for a gas flow from the inlet chamber I to the servo chamber III. This gas flow provides for a pressure bild-up in the servo chamber, so that the piston 12 and therewith the main valve body 2 are pressed upwards. The main valve body is forced to follow the movement of the servo valve body 5, the piston 12—and therewith the main valve body and the seat 6 of the control valve—immediately being positioned so that an equilibrium arises between gas supply and gas delivery from the servo chamber III. The gas delivery from the servo chamber is modest, and takes place in a friction-free clearance 14 between the operating means 4 and the housing 1. This implies that the main valve body 2 at all times is forced to follow the movement of the servo valve body 5 in a slavish manner. Consequently, there is obtained a very stable control of the gas quantity flowing through the valve. The pressure forces governing the movement of the piston 12 are so large that the friction in the sealing surface between the outlet chamber II and the servo chamber III is of no consequence for the stability in the gas regulation.

An important advantage of the gas regulating valve according to the invention is that one obtains a good capacity and a precise gas control even if the supply pressure should vary to a considerable extent. The only spring which is used in the gas regulating valve, is a small spring 10 which has the task to see to it that the valve body 5 of the control valve rests against the seat 6 so that the valve seals immediately when the gas supply is connected. In principle, this spring is not necessary, since the pressure difference between the inlet chamber I and the servo chamber III at all times seeks to push the valve body 5 of the control valve back against the seat 6.

I claim:

1. A servo gas regulating valve comprising:

a housing having an inlet chamber and an outlet chamber, a servo chamber arranged in the housing at the opposite side of the outlet chamber relative to the inlet chamber, and which is separated from the outlet chamber by means of a pressure sensitive movable means, a main valve having a main valve body cooperating with a seat facing said inlet chamber and separating the inlet chamber from the outlet chamber, said main valve body being fixed to a central portion of the pressure sensitive movable means, and having an axial channel therethrough which, in open condition, connects the inlet chamber to the servo chamber, and a control valve comprising an externally operable control valve body cooperating with a seat arranged at the end of the axial channel opening into the inlet chamber.

2. A valve according to claim 1, wherein said pressure sensitive movable means is a piston displaceably arranged within said housing.

3. A valve according to claim 1, wherein said pressure sensitive movable means is a diaphragm which is fixed to said housing at its outer periphery.

4. A valve according to claim 1, 2 or 3, wherein the control valve body comprises a rod extending through said axial channel and being connected to an externally actuable operating member.

* * * * *